July 4, 1967

K. W. GOFF ET AL 3,329,311

MASS-FLOW RATE CONTROL

Filed Nov. 22, 1965

United States Patent Office 3,329,311
Patented July 4, 1967

3,329,311
MASS-FLOW RATE CONTROL
Kenneth W. Goff, Abington, and Suresh C. Gupta, Philadelphia, Pa., assignors to Leeds and Northrup Company, Philadelphia, Pa., a corporation of Pennsylvania
Filed Nov. 22, 1965, Ser. No. 509,052
6 Claims. (Cl. 222—1)

ABSTRACT OF THE DISCLOSURE

A constant decreasing set point for the mass in a container is established by an integrating amplifier having a preset constant input signal. The existing mass in the container is measured by a load cell and the measured value is compared with the changing set point. Any difference resulting from the comparison provides an error signal for controlling the discharge of material from the container so as to maintain the desired constant discharge rate. When the mass in the container is reduced to a minimum, rapid refilling is initiated and the discharge during refill is maintained constant at the value existing before refill was initiated. When refill is completed or after a fixed time sufficient for refill has elapsed, the controlled discharge is resumed without a bump since the capacitor of the integrating amplifier is maintained at a discharge such that no error signal exists during refill.

This invention relates to apparatus for the control of mass-flow rate and particularly to apparatus for controlling the mass-flow rate of a material being discharged from a storage bin or container by controlling the weight of the container to follow a decreasing set point value.

The problem of providing a continuous feed of material to a process is sometimes complicated by the nature of the material. For example, some materials such as powders or rock do not lend themselves to having their rate of flow to the process closely controlled by ordinary flow control apparatus. In such cases, the rate at which the material is fed to the process can be controlled by controlling the weight of the material in an auxiliary storage container to follow a decreasing set point value, usually a constantly decreasing one.

In the past, apparatus of this type has been so constructed as to require manual intervention for the maintenance of control or for the resetting of the controller whenever conditions in the process were of an extraordinary nature. Likewise, the prior art devices were not so constructed as to maintain the control effective for a maximum percentage of the time period in each cycle of operation.

It is therefore an object of this invention to provide an improved control system for controlling the mass-flow rate of material from a storage bin or container.

More particularly, it is an object of this invention to provide a controller for controlling the mass-flow rate of a material from a container so that the weight or mass of the material in the container is varied at a desired rate and so that the feed of material from the container can continue during refilling with a bumpless automatic resumption of control of the feed being effected after full or partial completion of the refilling operation.

It is a further object of this invention to provide a control of the mass-flow rate of a material from a container which is alternately emptied and refilled during a complete cycle so that the mass-flow rate of the material from the container is controlled during the emptying portion of the cycle and is maintained substantially constant during the refilling portion of the cycle.

In accordance with one form of this invention, there is provided a control system for controlling the mass-flow rate of a material from a container which is subject to being alternately emptied and refilling during its cycle of operation so that the mass-flow rate is controlled during the emptying portion and maintained substantially contant during the refilling portion of the cycle. The control includes a means for producing a first signal which is representative of the measured value of the mass or weight of the material in the container from which the mass-rate flow is to be controlled. A second signal which is continuously changing in magnitude during the discharge portion of the cycle is produced by another means. This second signal is representative of a continuously decreasing set point value for the mass of material in the container. There is then provided a means which is responsive to the difference between the first and second signals for controlling the mass-rate flow of the material being discharged from the container so as to tend to maintain the difference between those signals at a zero value. When the mass in the container reaches a predetermined minimum value, the refilling portion of the cycle starts. The refilling continues until the container has a mass or weight which is of a predetermined maximum value. The apparatus also includes a means operable during the refilling cycle for maintaining the mass-flow rate of the material from the container at a substantially constant value. In addition there is included a means operable to maintain the second signal at a value corresponding to the first signal while the container is being refilled. Upon completion of the refilling cycle, resumption of control of the discharge from the container is effected in response to means which are operable upon completion of the refilling cycle. With the resumption of control, the discharge of the material from the container is again controlled by the controller to a value such that the difference between the first and second signals is maintained as nearly as possible to a zero value as the setpoint or second signal is continuously decreased in value.

A better understanding of the present invention may be obtained from the following description in connection with the drawings in which like parts in the several drawings have like reference characters and in which.

Figure 1:
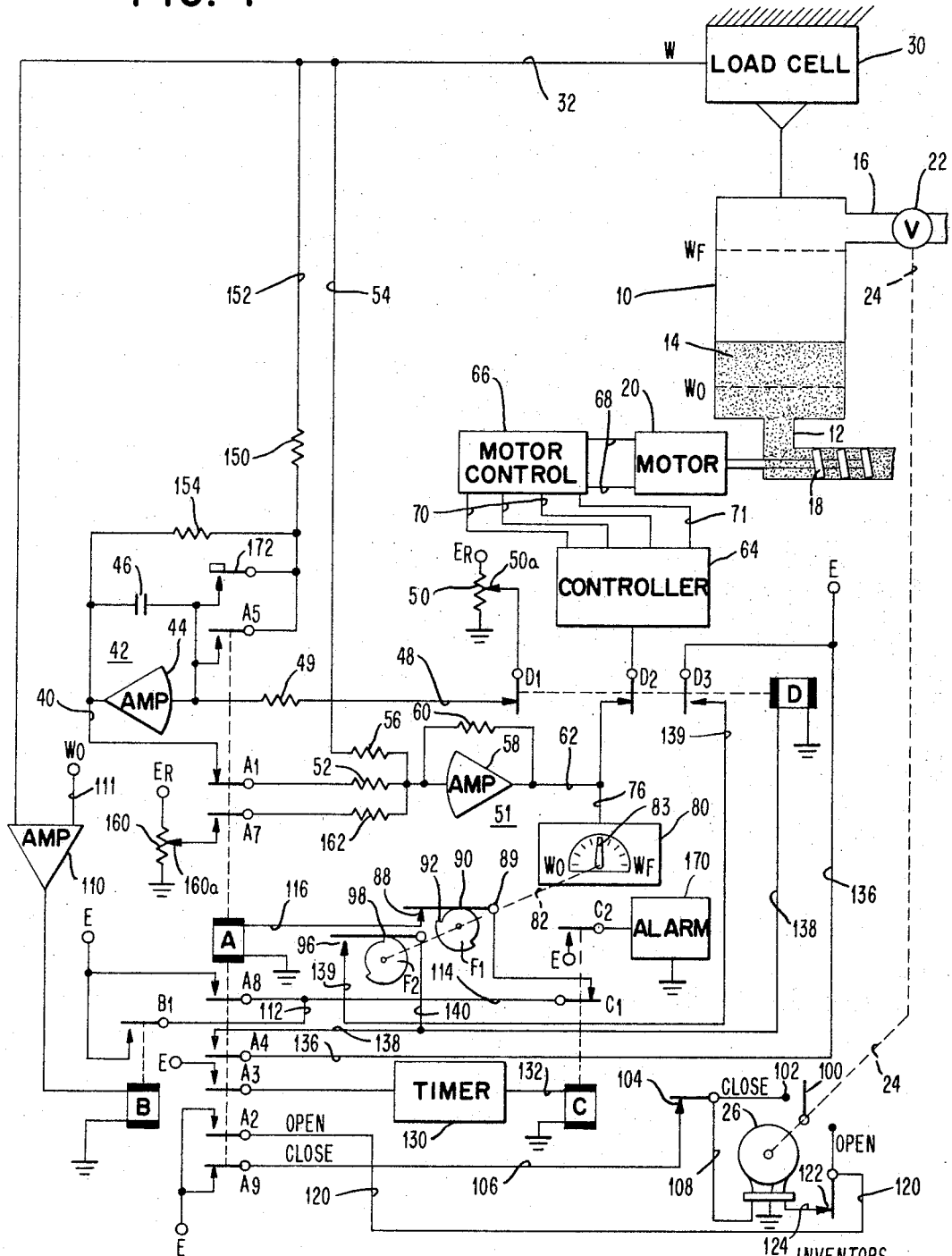
FIG. 1 is a circuit diagram showing one form of the invention.

With reference to FIG. 1, the container 10, which may be constructed as a large bin, has at the bottom a discharge duct 12 from which the material 14 contained within the container 10 is discharged. The bin or container 10 also has a refill duct 16 through which the material 14 is caused to flow at a rapid rate during the refilling operation.

As shown in FIG. 1, the discharge of the material 14 from the container 10 is effected by a screw-feeding device 18 which is rotated by motor 20. This type of discharge device or other types such as star feeders may be necessary, for example, where the material 14 is a powdery substance or a rock-like substance. In some applications the material 14 may be other than powder or rock-like substance in which case the discharge device could be any of a number of suitable devices for effecting a discharging of the material from the container 10 in a controllable fashion.

In the refill duct 16 there is shown diagrammatically a valve 22 which for the purposes of this description will be assumed to be a suitable type of valve which can be opened by the mechanical coupling 24 which is a shaft rotated by motor 26 so that the material 14 may be forced into the container 10 at a rate which is desirably as rapid as can be readily obtained. A fast refill of the container 10 is desirable so that the mass-flow rate from the discharge duct 12 can be maintained under control for a maximum percentage of the total time period of each cycle of operation. For the purposes of this description a cycle of operation includes two portions, namely a discharge portion during which period the material 14 is being discharged from the container 10 through duct 12 and a refill portion during which the material 14 is being forced into the container 10 through duct 16. It will be evident from the following description that the discharge through the duct 12 is continued even during the refilling portion of the cycle since process requirements usually require that the material 14 be provided at a substantially continuous rate and the processes of the type to which the present control is applicable are usually not of the type which can be interrupted for the refilling portion of the cycle.

As has been previously mentioned, the mass-flow rate of the material 14 from the container 10 is controlled during the discharge portion of each cycle of operation by maintaining control of the mass of the material 14 in the container 10 so that it follows a constantly decreasing set point value. To provide such a control, it is necessary that the mass or weight of the material 14 be constantly measured. In FIG. 1 this measurement is made by load cell 30 which is so arranged that it produces a signal on line 32, signal W, which is continuously related to the mass or weight of the material 14 in the container. Since the weight of the container 10 remains constant, the signal W can easily be compensated for the weight of the container 10. The load cell 30 may be any of a number of devices used for producing electrical signals proportional to the weight of a container. The load cell may, for example, include strain gauges and the necessary associated circuitry.

For the purposes of illustration, let it be assumed that the level of the material 14 in container 10 is somewhere between a lower minimum level representative of the minimum mass $W_o$ to which the mass in container 10 will be allowed to go before a refilling operation is begun and the maximum value, $W_f$, to which the container is refilled as quickly as possible after the mass has reached the minimum value $W_o$. When the material level in the container 10 is somewhere between $W_o$ and $W_f$, as shown in FIG. 1, the motor 20 is operated by the control system to rotate the screw type discharging device 18 so as to maintain the mass-flow rate through the exit duct 12 at the desired value.

The desired value or set point for the mass-flow rate is established on line 40 at the output of an operational amplifier 42. Amplifier 42 includes the high-gain amplifier 44 and a feedback capacitor 46 so as to provide at its output, which is connected to line 40, a signal which is the integral of the input from line 48 into the input resistor 49 of amplifier 42. It will be evident that a constantly decreasing set point value may be established by the output of amplifier 42 on line 40 if a constant signal is maintained on the input line 48. The constant signal on line 48 is shown as being established by the position of the movable contact $50a$ of potentiometer slidewire 50 which is connected at one terminal to a reference potential $E_R$ and at its other terminal to ground. The adjustable contact $50a$ is connected to line 48 through relay contact $D_1$ which will at this time be closed. A non-linear or a discontinuous change in the set point value may be established by a programmed change in the position of contact $50a$, as desired.

The set point value represented by the signal on line 40 as established by a fixed position for contact $50a$ is fed to operational amplifier 51 by way of the closed relay contact $A_1$ and input resistor 52 of amplifier 51. The other input through amplifier 51 which is effective at the same time is input signal W from line 32 which is fed through line 54 and input resistor 56 to amplifier 51.

It will thus be evident that amplifier 51 which includes the high gain amplifier 58 and a feedback resistor 60 is effective to compare the signal W on line 54 with the set point established on line 40 and produce on output line 62 a signal indicative of the difference between the set point and the signal W which is indicative of the mass of material 14 in container 10.

The signal on line 62 is connected through the normally closed relay contact $D_2$ to controller 64 which is in turn connected to motor controller 66 so that the motor controller 66 may by virtue of the connecting line 68 control the speed of motor 20 so as to tend to discharge the material 14 at a rate which will maintain the signal on line 62 as close to zero as possible by maintaining W at the set point.

As shown in FIG. 1, the controller 64 is connected for both forward and reverse operation of the motor control 66 by the three lines 70 and the motor control 66 is likewise connected to provide a feedback over line 71 to controller 64. The controller 64 may be any one of a number of well known types of controllers which are capable of accepting an error signal as an input and providing an output for positioning a motor control which may, for example, include a motor-operated rheostat capable of controlling the speed of motor 20.

The signal on line 62 is also fed by way of line 76 to an indicator 80 which may be of the circular type as shown in FIG. 1. The indicator 80 of FIG. 1 may have its scale covering a 180° span. Indicator 80 includes on shaft 82, connected to rotate with the indicating pointer 83, cams $F_1$ and $F_2$. The cam $F_1$ is so shaped that when the indicating pointer 83 reaches the full scale point, marked $W_f$, the contacts 88 are opened by virtue of the pivoting of the upper contact about its pivot point 89 when the cam surface 90 rides up on the shoulder 92 of cam $F_1$. The cam $F_1$ is so designed that the contacts 88 are maintained closed over the full range of the indicating pointer 83 between $W_o$ and $W_f$ at the upper end and the contacts are separated only when the indicator 83 reaches $W_f$. The contacts 88 are under no circumstances separated when the indicator 83 is in the lower portion of the scale.

The cam $F_2$ is so shaped that the contacts 96 are maintained closed when the indicating pointer 83 is in the upper half or right-hand portion of the scale and contacts 96 are open whenever the indicator 83 has dropped to the mid-point on the scale, or below. Contacts 96 are operated by a pivoted cam follower 98 in a manner similar to that described for the operation of the contacts 88 by cam $F_1$. The particular function which is carried out by the contacts 88 and 96 will be described in a subsequent portion of this description.

When the material 14 in container 10 is at a level between $W_o$ and $W_f$ the valve 22 is closed and the limit switch arm 100 rotated by shaft 24 of motor 26 would be positioned against the limit switch operator 102 so as to have opened contacts 104, disconnecting the line 106 from line 108, so that current can no longer be supplied to motor 26 to move the valve in a "close" direction. When the valve is being moved in a "close" direction, current is normally supplied from a potential source E to normally closed contact $A_9$ to line 106 and through the closed contacts 104 to line 108 and the the "close" windings of motor 26.

When the level of the material 14 in container 10 reaches an approximate level indicated as $W_o$ at which the mass in container 10 will have reached a value $W_o$, the signal on line 32 will be representative of a mass $W_o$. The signal on line 32 is compared at relay amplifier 110 with the present signal $W_o$ supplied on line 111 and when the signal on line 32 is equal to that on line 111 or is below that level, it is an indication that the mass of the material in the container 10 has decreased to the minimum point and that a refilling of the container 10 is required.

To begin the refilling operation, the relay amplifier 110 actuates relay B so as to make the normally open relay contact $B_1$ which connects the potential source E through line 112, line 114, the normally closed contact $C_1$ and the closed contacts 88 to connect relay A for energization. As shown in FIG. 1, the relay A has one terminal connected to line 116 and the other connected to ground.

The energization of relay A causes a number of changes in the control circuit which will now be explained. Contact $A_8$, for example, will be closed keeping the relay A energized. Contact $A_9$ will be opened disconnecting the "close" circuit of motor 26 and contact $A_2$ will be closed to connect the potential source E through line 120 and the closed limit switch contacts 122 to line 124 which in turn connects to the "open" winding of motor 26 causing a clockwise rotation of the shaft 24 and its limit switch actuator 100. Thus, the closing of contact $A_2$ causes shaft 24 to open valve 22 to allow for a refilling of container 10.

The energization of relay A also closes contact $A_3$ to connect the potential source E to timer 130 which is so designed that upon the expiration of a preset period of time following the energization of timer 130 from potential source E, it will produce an output on line 132 which will energize relay C. Relay C is shown in FIG. 1 as having one of its terminals connected to line 132 and its other terminal connected to ground. The effect of an energization of relay C will be described at a later point in this description.

The energization of relay A also causes a closing of relay contact $A_4$ so as to connect the potential source E by way of line 136 to line 138 and hence to one terminal of relay D, the other terminal being connected to ground. This will cause an energization of relay D which will in turn cause a closing of the normally open contact $D_3$ and then opening of the contacts $D_1$ and $D_2$. The closing of the contact $D_3$ completes a holding circuit consisting of the connecting line 139, contacts 96 and line 140. Since indicator 80 will be at the middle of its scale during most of the period when container 10 is being discharged if the signal on line 76 is zero, the contacts 96 will be open as shown in FIG. 1 so that the holding circuit including relay contact $D_3$ will not be completed immediately.

The opening of the relay contact $D_2$ disconnects the controller 64 from line 62 so that the controller 64 is no longer effective to vary the speed of motor 20. Instead the speed of motor 20 is maintained at the speed at which it was running when the contact $D_2$ was disconnected or opened.

Opening of relay contact $D_1$ disconnects the potential obtained from the movable contact 50a from the input line 48 of amplifier 42 so that the output of amplifier 42 on line 40 ceases to change in response to the potential on contact 50a.

The closing of normally open relay contact $A_5$ connects the feedback capacitor 46 of amplifier 42 to the potential on line 32, representative of the signal W, by way of resistor 150 and line 152 so that the capacitor 46 is maintained with a charge such that the signal on line 40 corresponds to that on line 32 and is equal to the negative value of the signal W. With the relay contact $A_5$ closed, the capacitor 46 is shunted by resistor 154.

The relay contact $A_1$ will be disconnected upon energization of relay A so as to disconnect the set point signal on line 40 from input resistor 52 so that the set point is no longer provided as an input to amplifier 50. In place of the set point input, a fixed input is provided by the closing of relay contact $A_7$ so that a preset potential from movable contact 160a on potentiometer 160 is coupled through input resistor 162 to amplifier 58.

The potentiometer 160 is connected at its upper terminal to a reference potential $E_R$ while its lower terminal is connected to ground. The reference potential from movable contact 160a should be of such a value that the effect on indicator 80 is to convert it from a zero center instrument indicating the deviation of the mass W from its set point to an indicator which will indicate the mass in the container 10 with the left-hand end of the scale indicating a mass of $W_o$ while the right-hand of the scale indicate a mass of $W_f$ It will be evident that upon energization of relay A the amplifier 50 has as its input the signal on line 54 and the potential from movable contact 160a so that the signal on line 62 and line 76 is such that indicator 80 will indicate the mass of the material 14 in container 10 as the refilling operation proceeds. At the beginning, the indicator pointer 83 will be opposite $W_o$.

The remaining relay contact $A_8$ which is closed upon energization of relay A is effective to connect the potential source E through line 114, closed contact $C_1$, closed contacts 88 and line 116 to provide a holding circuit to maintain relay A in an energized state. It is desirable that relay A be maintained in an energized state until the container 10 is filled at least to a level such that the mass in the container equals $W_f$. When the mass of material 14 in the container has reached the level such that it is equal to $W_f$, the indicator 83 will be at the right hand limit of its scale and the contacts 88 will open so as to release the holding circuit and cause relay A to de-energize. If the material available for refilling the vessel 10 is not sufficient to bring the mass in container 10 to the point where it equals $W_f$, then the relay A would not be de-energized until contact $C_1$ is opened by the energization of relay C at the end of the time period set for the timer 130. Thus, the refilling operation can be discontinued automatically under either of two alternative conditions, namely when the mass of material 14 has reached a value equal to $W_f$ or when the particular time period set in timer 130 has expired after the initial energization of the timer 130 by the closing of contact $A_3$. The refilling operation could, of course, be discontinued manually by an operator at any time.

If the filling operation has successfully brought the mass of material to a value equal to $W_f$ so as to cause the de-energization of the relay A, the contact $A_9$ will again be closed so that the motor 26 will be operated in a "close" direction until the limit switch contacts 104 are opened, as previously explained. If the motor 26 operates at a speed such that valve 22 will close with sufficient rapidity so that over filling of the container 10 is not experienced, then upon a disconnection of the relay contact $A_7$, the connection of contact $A_1$ and the disconnection of contact $A_5$. The set point signal on line 40 will be at a value corresponding with $W_f$, the signal on line 54 will correspond with $W_f$ and hence the output of amplifier 50 will be at a zero level. Since the disconnection of contact $A_7$ causes the indicator 80 to then be a zero center instrument, the pointer 83 will be at the center point on the scale and the contacts 96 will be maintained open so that relay contact $D_3$ will not be effective to act as a holding circuit for the relay D. The D relay will then be de-energized, thus reconnecting the controller 64 by making relay contact $D_2$ and reconnecting the movable contact 50a to line 48 by the making of contact $D_1$.

By virtue of the fact that during the filling operation the capacitor 46 has been maintained charged to a potential such that the signal on line 40 is maintained equal to the signal on line 54, there is then provided upon a re-establishment of control a bumpless transfer to a controlled operation of motor 20 so that the discharge portion of the cycle is again begun and the set point on line 40 will be constantly decreased by virtue of the integrating effect of amplifier 42 which receives an input signal on line 48 from the variable contact 50a.

Having explained above a complete cycle of operation, it will now be explained how the system of FIG. 1 can accommodate various deviations from the normal expected operation of the system. For example, if the motor 26 should close the valve 22 at such a rate that the container 10 is overfilled, the signal on line 32 will then be above the value $W_f$ and hence when the de-energization of relay A makes the indicator 80 a zero center instrument, the indicating pointer 83 will be to the right of the center point and the cam follower 98 will be off the shoulder of the cam and the contacts 96 will be closed so as to complete with the closed contact $D_3$ a holding circuit for relay D. This holding circuit includes the contact $D_3$, line 139, contacts 96 and line 140, as well as line 138. The relay D will then be maintained in an energized state in spite of the de-energization of relay A and the relay contacts $D_1$, $D_2$ will be maintained in an open condition, thus maintaining the controller 64 disconnected from line 62 and maintaining a disconnection of the variable contact 50a from the line 48. The result of the maintenance of an energization of relay D will be to delay the reestablishment of control over the discharge of material from container 10 until the time when the constant discharge which was maintained during the refilling operation is such as to bring the mass of the material 14 down to a level where it is equal to $W_f$. At that time, the contacts 96 will open since the pointer 83 will have reached the center point of the scale and the cam follower 98 will have reached the shoulder of cam $F_2$ so that the contacts 96 will be opened with the resulting release of the holding circuit for relay D and the consequent de-energization of that relay so as to reestablish control by the closing of contacts $D_1$ and $D_2$.

The situation may arise in which the availability of material for refilling the container 10 is insufficient to bring the mass of the material 14 up to a value equal to $W_f$. In that case, the timer 130 will be effective to cause the de-energization of relay A by disconnecting relay contact $C_1$. At the same time, normally open contact $C_2$ will be made so as to connect the source of potential E with an alarm circuit 170 which will cause the alarm to be actuated and bring the attention of the operator to the situation. The operator may then take the necessary steps to correct the situation. Meanwhile, however, control is not stopped. Instead the circuit of FIG. 1 is so arranged that control will be resumed and the discharge rate, that is the mass-flow rate of material 14 from the container 10 will be controlled in accordance with a decreasing set point value as established on line 40. Thus, even though the material available is insufficient to fill the container 10, there will be a transfer back to control and it will be bumpless by virtue of the closing of the contact $A_5$ during the refilling operation.

The manually operated contact 172 is provided so that the control system may be started up without causing a rapid change or a bump in the control system. The manually operated contact 172 serves the same function as contact $A_5$ of relay A in that it connects line 152 to capacitor 46 by way of resistor 150 so that the signal on line 40 will be maintained at a value equal to that on line 54 when the contact 172 is closed. Thus it will be seen that the effect of closing the contact 172 would be to bring the signal on line 62 to zero as is desirable when starting up the control system or under certain other conditions.

Figure 2:
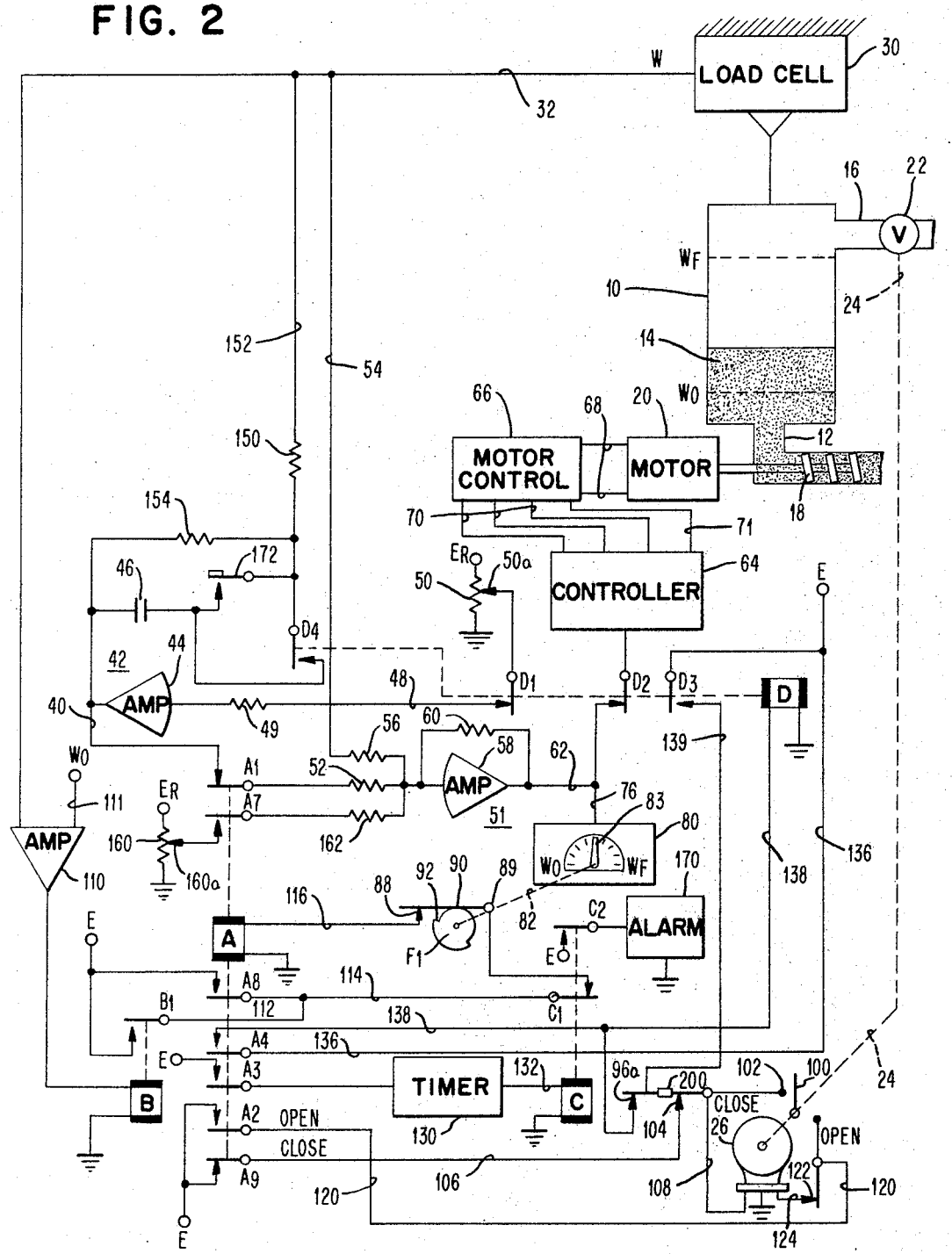
FIG. 2 is a circuit diagram of a system similar to that in FIG. 1 but with several variations which change slightly the mode of operation.

The control system of FIG. 1 may be modified as shown in FIG. 2. This modification includes the omission of the cam $F_2$ and its associated contacts 96 and the substitution for the contacts 96 of the limit operated contacts 96a which serve the same purpose as the contacts 96 of FIG. 1 and which are opened when motor 26 has caused the valve 22 to reach its closed limit. Thus the relay D in FIG. 2 is de-energized whenever the filling portion of the cycle is completed as indicated by the full closing of the valve 22. In order that the control may be properly effected upon de-energization of relay D, a normally open contact $D_4$ is substituted for the contact $A_5$ of FIGURE 1 so that instead of the set point value represented by the signal on line 40 in FIG. 1 being maintained at a value $W_f$, the line 40 in FIG. 2 will be equal to whatever mass is contained in the container 10 at the time that the valve 22 is completely closed and relay D is de-energized. In the case of an over-filling of the container 10, as may occur when the valve 22 is slow in closing, the signal on line 40 will then be above the value $W_f$ but it will nevertheless be equal to the value W so that a bumpless reestablishment of control may be effected. In the circuit of FIG. 2, the control is reestablished before the over-filled container 10 is emptied to the point where the mass is equal to $W_f$ and hence the control will be effective for a greater percentage of the time than would be the case with the arrangement of FIG. 1.

In FIG. 2, the contacts 104 are isolated from the contacts 96a by an insulating segment 200 which is interposed between the contacts 104 and 96a on the pivoted member 102.

It will be evident to those skilled in the art that other variations of the control apparatus herein described may be advantageously utilized for the maintenance of a desired mass-flow rate of material from a container. For example, the control may be carried out by a mechanical system or by a completely digital apparatus while still utilizing the novel features of the invention. It is likewise apparent that the mass-flow rate of the material may as previously mentioned be made non-linear during the emptying portion of the cycle if such an arrangement should be desirable for the particular process to which the apparatus is being applied.

In addition, it will be evident that under some circumstances it may be desirable to completely discontinue the discharge of material from the container during the refilling portion of its cycle and indeed such a mode of operation may be desirable in some processes. While the system here described tends to maintain a substantially constant discharge during the refilling portion of the cycle based upon a desired mass-flow rate which is predetermined, the predetermined rate may under some conditions be desirably of zero magnitude. Under still other circumstances the discharge rate during refilling could be in accordance with any desired program depending upon the process with which the control is associated.

What is claimed is:
1. A control system for controlling the mass-flow rate of material from a container which is subject to being emptied by the discharge of said material during one portion of a cycle and refilled during another portion comprising a first means for producing a first signal representative of a measured value of the mass of said material in said container, a second means for producing a second signal continuously changing during said discharge portion of said cycle, said second signal being representative of a continuously decreasing set point value for the mass in said container, a third means responsive to the difference between said first and said second signal for controlling the mass-flow rate of the material being discharged from said container so as to tend to maintain said difference at zero, a fourth means operable when said mass in said container reaches a predetermined minimum value to start said refilling portion of said cycle to refill said container until it contains a predetermined maximum mass, a fifth means operable during said refilling portion of said cycle for maintaining said third means unresponsive to the said difference so that the mass-flow rate of said material from said container is maintained at a substantially constant value during said refilling portion of said cycle, a sixth means operable to maintain said second signal at a value corresponding with said first signal while said container is being refilled, a seventh means operable after completion of said refilling portion of said cycle to cause resumption of the control of said discharge by said third means, and an eighth means operable a predetermined time period after the beginning of said refilling portion of said cycle to cause resumption of the control of said discharge if said refilling portion has not already been completed.

2. A control system as set forth in claim 1 in which said eighth means includes a timer producing a signal after a predetermined period following the beginning of said refilling portion, said signal being operative to effect a resumption of control.

3. A control system for controlling the mass-flow rate of material from a container which is subject to a continuous discharge and a relatively rapid refill comprising
means for producing a first electrical signal corresponding with the measured value of the existing mass of material in said container;
means for producing a second electrical signal to provide a changing set point for said measured value during a controlled period of said discharge;
means responsive to the deviation of said first and second signals to control the discharge of said material from said container so as to tend to maintain said deviation at zero;
means for detecting the decrease of the mass in said container below a preset minimum value, said detecting means being operable to
(a) disconnect said control means so as to maintain the mass-flow rate of discharge from said container at a substantially constant value corresponding with that existing at the time said minimum was reached,
(b) initiate a refilling of said container, and
(c) connect said first signal to said means for producing said second signal in manner to maintain said second signal at a value corresponding with that of said first signal during said refilling;
means for detecting the increase of the mass in said container to a preset maximum value, said increase detecting means being operable to
(a) disconnect said first signal from said second signal producing means to prevent said second signal from continuing to follow said first signal,
(b) initiate a cessation of the refilling operation, and
(c) detect the change of said first signal to equality with said second signal for reconnecting said control means for reestablishing said changing set point so as to again control the discharge from said container to obtain the desired mass-flow rate.

4. A control system for controlling the mass-flow rate of material from a container which is subject to being emptied by the controlled discharge of said material during one portion of its cycle and refilled during another portion of its cycle while the discharge is maintained substantially constant comprising
a load cell for producing a first electrical signal representative of a measured value of the mass of said material in said container,
an integrating circuit including an integrating amplifier and having a reference potential as an input thereto for producing a second signal continuously changing so as to produce during the controlled discharge portion of said cycle a second signal representative of a continuously decreasing set point value for the mass in said container,
an operational amplifier having as its inputs said first and said second signals so as to produce at its output a signal indicative of the difference between said first and said second signals, said operational amplifier being coupled during the controlled discharge portion of the said cycle to a controller which is in turn coupled to operate a motor control for varying the discharge rate of material from the said container so as to tend to maintain the output of said operational amplifier at zero,
a relay amplifier responsive to said first signal and a signal indicative of a predetermined minimum value and operable upon said first signal reaching a value indicative of said predetermined minimum value to start the refilling portion of said cycle,
relay means operable during said refilling portion of said cycle for disconnecting said controller and for maintaining the mass-flow rate of said material at a value substantially equal to that existing at the time said controller was disconnected,
relay contact means operable during said refilling portion of said cycle for connecting said first signal to said integrating amplifier so that the output of said integrating amplifier is maintained at a value corresponding with said first signal during said refilling portion of said cycle, and
means responsive to said first signal reaching said maximum value for the mass in said container for effecting a resumption of the control of said discharge by reconnecting said controller so as to tend to maintain the said difference between said first and said second signal at zero while said second signal is continuously being decreased in value.

5. A control system for controlling the mass-flow rate of material from a container which is alternately emptied and refilled comprising
means for producing a first electrical signal indicative of a measured value of the mass of material in said container,
means including an integrating amplifier having a feedback capacitor for producing from a reference electrical signal a programmed second electrical signal indicative of the set point for said measured value of said mass,
means responsive to the difference between said first and said second electrical signal for controlling the discharge of material from said container so as to maintain said first signal equal to said second signal during the period when said container is being emptied, and
means operable when said container is being refilled to maintain a desired discharge rate therefrom and to maintain the charge on said feedback capacitor at a value such that said second signal is maintained equal to said first signal so that reestablishment of control of said discharge can be carried out without a bump.

6. A method for controlling the mass-flow rate of material from a container which is subject to being alternately emptied and refilled during its cycles of operation so that the rate of discharge of material is controlled during said emptying portion of the cycles and is maintained at a predetermined value during the refilling portion comprising the steps of
producing a signal indicative of the measured value of the mass of material in said container,
producing during said emptying portion of each of said cycles a changing signal indicative of the set point for said measured value required to maintain a desired program for the mass-flow rate of said material from said container,
controlling the discharge rate of said material from said container during said emptying portion of said cycles to tend to minimize the deviation of said measured value signal from said set point signal,
establishing the discharge during said refilling portion of said cycle at a rate which will maintain the mass-flow rate from said container substantially at the value existing at the end of said emptying portion of said cycle, maintaining the value of said set point signal at the existing measured value signal during said refilling portion of each of said cycles, and reestablishing control of the discharge rate after a predetermined period of time if said container is not refilled during that period to begin the emptying portion of next cycle with said set point signal equal to said measured value signal.

References Cited

UNITED STATES PATENTS

| 2,984,387 | 5/1961 | White | 222—58 |
| 3,099,368 | 7/1963 | Turner et al. | 222—58 |

ROBERT B. REEVES, *Primary Examiner.*

HADD S. LANE, *Examiner.*